(No Model.)

J. E. HILL.
FILTER.

No. 492,161. Patented Feb. 21, 1893.

ON 3—3

Witnesses;
Sidney P. Hollingsworth
Horace A. Dodge.

ON 4—4

Joel Edgar Hill,
Inventor,
by his attorneys,
Dodge & Sons.

THE NORRIS PETERS CO., PHOTO-LITHO., WASHINGTON, D. C.

UNITED STATES PATENT OFFICE.

JOEL EDGAR HILL, OF GERMANTON, NORTH CAROLINA.

FILTER.

SPECIFICATION forming part of Letters Patent No. 492,161, dated February 21, 1893.

Application filed May 26, 1892. Serial No. 434,428. (No model.)

*To all whom it may concern:*

Be it known that I, JOEL EDGAR HILL, a citizen of the United States, residing at Germanton, in the county of Stokes and State of North Carolina, have invented certain new and useful Improvements in Filters, of which the following is a specification.

My invention relates to filters, and has reference more particularly to that class of filters in which a porous filtering medium is employed.

It is a fact well known that after a little while the outer surface or the inner surface of the filtering body or medium (according to whether the water be admitted into the interior of the body or to the exterior thereof) becomes fouled or clogged with dirt or sediment so as to effectually close the pores of the filtering body and render the filter useless. To overcome this objection brushes have been provided for such filtering mediums, which brushes have been so arranged as to be carried over the surface of the filtering medium and remove the collection of sediment &c. thereon. One serious difficulty present in all cleaning devices of which I am aware, resides in the fact that the brush or other cleaning device remains at all times in the water chamber of the filter, so that as the water circulates through the filter it must come into contact with the material of which the brush or other cleaning device is constructed. This is found in practice to give an unpleasant odor and taste to the water, and has been the reason, I believe, why these cleaning devices have not come into general use.

The object of the present invention is to provide a filter with a cleaning device which, when not in use, shall not remain in the water chamber to give either a bad taste or odor to the water.

Figure 1:
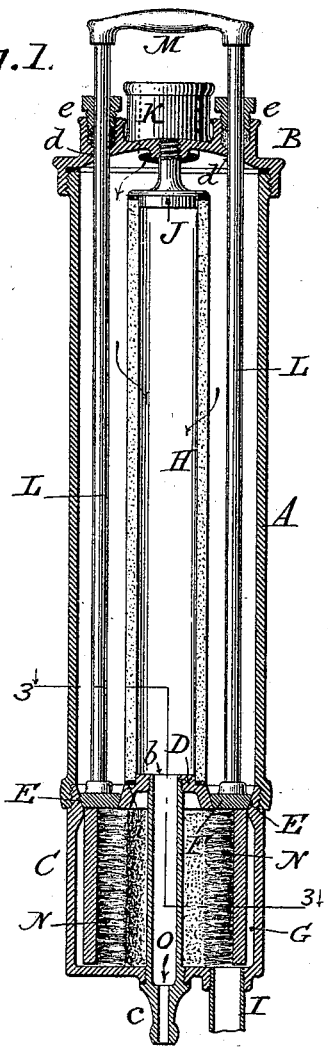
Figure 2:
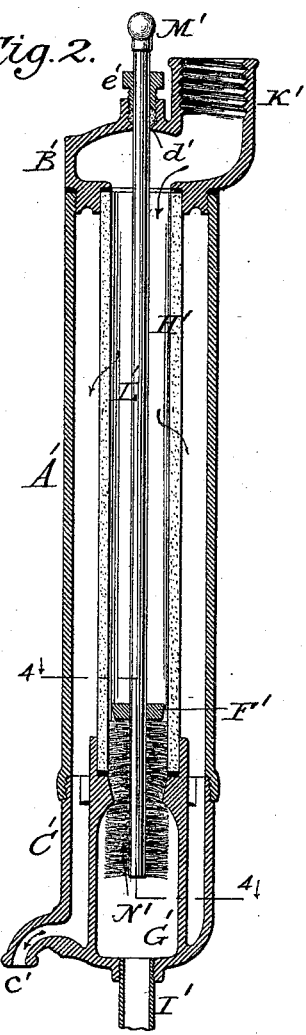
Figure 3:
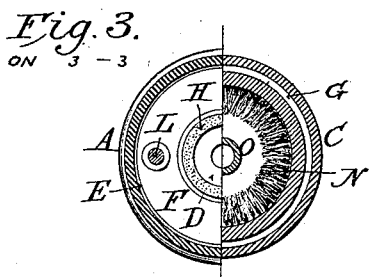
Figure 4:
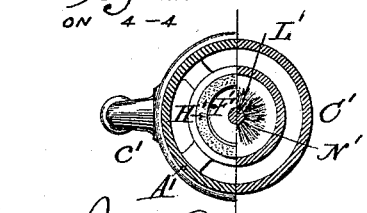

In the accompanying drawings,—Figure 1 is a vertical central sectional view showing my improvements applied to that class of filters commonly known as a "Pasteur" filter; Fig. 2, a vertical central sectional view showing my improvements applied to a similar class of filters, in which the water passes from the inside out through the walls of the filtering material instead of inward through the walls as in the preceding figure; Fig. 3, a horizontal sectional view on the line 3—3 of Fig. 1; and Fig. 4, a horizontal sectional view on the line 4—4 of Fig. 2.

A indicates the shell or casing of the filter, which casing has at its opposite ends the caps B and C, which are preferably united to the main body of the shell or casing by screw threads as shown, or in any other equivalent manner. Secured to the bottom cap C is a central disk D, which, in connection with the inclined wall E, forms an annular valve seat adapted to receive an annular valve or ring F, as clearly shown in Fig. 1. When the valve F is to its seat, as shown in said figure, the chamber G, formed in or by the bottom cap C, is effectually cut off from the main body of the filter.

The central disk D is shouldered as at $a$, so as to form a seat for the lower end of the filtering medium, which I prefer to construct in the form of a tube or cylinder H, as is now commonly done with the ordinary Pasteur filter. I do not wish, however, to limit myself to the form of the filtering medium employed, as it will be obvious that the invention can be applied to other styles and forms of filtering mediums. The disk D is further provided with a central opening $b$, into which screws a tube or pipe O, whose lower end projects out through the bottom plate of the cap C, where it is provided with a nipple $c$ through which the filtered water is discharged.

The chamber G, formed in or by the bottom cap C, is designed to receive the cleaning device when not in use, and is provided with an outlet or discharge pipe I, for a purpose presently explained.

The top cap B is provided on its under face with a foot J, which preferably not only projects into the upper end of the tube H, but also bears upon the upper end of the said tube. This foot J may be cast integral with the cap portion B or may be made separate therefrom as may be preferred. In this cap portion is also formed the inlet K and suitable openings $d$, through which latter pass the rods L. These rods, which pass between the tube H and the shell or casing A, are connected at their upper ends by a suitable handle M, and are secured at their lower ends to the valve F, as shown in Fig. 1,—the cap B being provided with suitable stuffing boxes e to prevent the escape of water from around the rods L where they pass through the cap.

The brushes, rubbers, or equivalent cleaning devices, N, are secured to the under side of the valve F, and are of such a length as to permit the valve F to come to its seat when the said cleaning devices are within the chamber or compartment G. Now, when it is desired to clean the filter it is only necessary to pull upward upon the handle M, thereby lifting the valve off its seat and bringing the bristles or cleaning surface of the cleaning device N in contact with the exterior of the tube H. Several reciprocations of the cleaning device over the exterior of the tube will remove the sediment and foul matters deposited thereon by the unfiltered water.

In cleaning the filter, the water supply should not be shut off but a little water allowed to run through the filter so as to wash the matters removed from the tube, down through and into the chamber or compartment G, from which they escape through the outlet or discharge pipe I. After the filter has been cleaned, the valve is brought to its seat and the brushes will be found to be located wholly within the compartment G and out of contact with the water to be filtered,—the pressure of the water upon the upper face of the valve F keeping the valve to its seat and cutting off the chamber G from the main body or portion of the filter.

In the construction shown in Fig. 2 the cleaning device N', instead of being arranged outside of the tube H', is arranged to work within the latter, as under this construction of filter it is the inner wall of the tube that becomes fouled and requires cleaning. The bottom cap C' is, under this arrangement, provided with a valve seat to receive the valve F' carried by the rod or stem L', and is further provided with an outlet c' for filtered water, and an outlet I' for carrying off the dirt and sediment removed from the filtering medium. The shell or casing A' will under this arrangement be provided with a cap B' having an inlet K' and a hole or opening D' through which the valve rod or stem L' projects,—a suitable stuffing box e' being provided here as under the former construction, to prevent leakage.

While I have shown the shell or casing of the filter as made up of three sections, I do not wish to be understood as limiting myself to such an arrangement, as the construction of the filter proper constitutes no part of the present invention.

While I am aware, as before stated, that cleaning devices have been applied to filters, I am not aware that anyone prior to my invention has provided a filter with a cleaning device capable of moving or being moved into a compartment or chamber which can be shut off from the rest of the filter, so as to avoid the contamination of the filtered water, or the water to be subsequently filtered, and this idea is claimed broadly, regardless of the specific means by which this result is attained.

Having thus described my invention, what I claim is—

1. In a filter, the combination with a shell or casing, of a filtering medium therein, a cleaning device for the filtering medium, and a chamber outside of the filtering chamber into which the cleaner may be moved.

2. In a filter, the combination with a shell or casing divided into two compartments or chambers by a filtering medium, a cleaning device for the latter, and a third chamber into which the cleaning device is placed after the cleaning has been effected.

3. In a filter, the combination with a shell or casing, of a filtering medium therein, a cleaning device, a chamber into which the cleaner may be moved, and a valve for closing the cleaner-chamber and separating it from the filtering chamber.

4. In a filter, the combination with a shell or casing, of a filtering material therein, a cleaning device, a chamber into which the cleaner may be moved, and a valve carried by the cleaner to close the said chamber when the cleaning has been effected.

5. In a filter, the combination with a shell or casing, of a filtering medium therein, a cleaner, a chamber into which the cleaner is placed after the cleaning has been effected, a valve for closing said chamber, and an outlet or waste pipe for the said chamber.

6. In a filter, the combination with a shell or casing, of a filtering medium, a chamber at the base of the latter, a reciprocating cleaner adapted to move over the face of the filtering medium, and, when not in use, to move into the said chamber, and a valve for separating or cutting off the cleaner-chamber, held to its seat by the pressure of the water within the filtering chamber.

7. A filter comprising the following elements, to wit: a shell or casing, a filtering medium, a cleaner for the latter, adapted to work within that portion of the filter and against that face of the filtering medium which receives the unfiltered water, a chamber separate and distinct from the chamber that receives the unfiltered water, adapted to receive the cleaner when not in use, and means for connecting and disconnecting the said cleaner-chamber with the chamber that receives the unfiltered water.

8. In combination with a shell or casing, and the upright filtering medium therein, the cleaner provided with the actuating handle and the downwardly-seating valve, and the cleaner-chamber at the lower end of the shell or casing, provided with a valve seat and an outlet.

9. In combination with the main body or shell, the filtering tube, the cap provided with a foot piece to bear upon the upper end of the tube; the bottom cap, a foot to support the lower end of the tube, a valve seat at the lower end of the tube, and the cleaner provided with the brushes and valve, and with the actuating handle.

10. In combination with the shell or casing, the filtering tube therein, a water inlet, a filtered-water outlet from the tube, a chamber at the lower end of the shell or casing, a valve seat at the upper end of the chamber, and a ring-like valve provided with actuating rods and with cleaners.

11. In combination with the shell or casing A, provided with the cap B at its upper end, and the cap C at its lower end, a filtering tube H within the shell or casing, a disk D supporting the lower end of the tube, a foot J supporting the upper end of the tube, a pipe H carried by the cap C and serving to support the disk D, a valve seat formed by the disk D and the inclined walls E of the lower cap C, a ring-shaped valve F provided with actuating rods L and with cleaners N; a water inlet K, and a discharge pipe I, all substantially as shown and described.

In witness whereof I hereunto set my hand in presence of two witnesses.

JOEL EDGAR HILL.

Witnesses:
 WALTER S. DODGE,
 S. A. TERRY.